Patented Dec. 11, 1934

1,983,654

UNITED STATES PATENT OFFICE 1,983,654

REFINEMENT OF VITAMIN-CONTAINING UNSAPONIFIABLE MATTER OF OILS

Archie Black, New Brunswick, N. J., assignor to E. R. Squibb & Sons, New York, N. Y., a corporation of New York No Drawing. Application April 22, 1932,
Serial No. 606,904

3 Claims. (Cl. 167—81)

This invention relates to the refinement of the vitamin-containing unsaponifiable matter of oils.

In the processes commonly employed, the vitamin-containing unsaponifiable matter of oils is isolated by the successive steps of saponifying the oil, extracting the soap with a solvent in which the unsaponifiable matter dissolves but the soap does not, removing the solvent from the extract by evaporation, and removing most of the cholesterol from the extract by crystallization from a solvent. There remains a semi-solid brown mass, the crude unsaponifiable matter.

It is the object of this invention to provide a simple and efficient method of refining such unsaponifiable matter so as to obtain a product characterized by higher concentration of vitamins and by increased palatability in virtue of superior flavor, odor, and color.

Essentially the method of the invention comprises dissolving the unsaponifiable matter in a solvent not procured from petroleum, preferably a solvent selected from the group consisting of ether, benzol, chloroform, and alcohol; and treating the solution anaerically with an adsorbent, preferably an adsorbent selected from the group consisting of carbons of vegetable and animal origin and earths. Such treatment may be variously effected, as by agitating the solution with, or percolating it through a bed of, the adsorbent. Preferably a small amount of an antioxidant, say hydroquinone or pyrogallol, is added to the solution, and the adsorbent is freed of oxygen, before the treatment. Such treatment, which entails the loss of only a negligible quantity of vitamins, not only eliminates from the unsaponifiable matter a large proportion of the inert substances, but also makes it far more acceptable for human consumption.

As an example, 60 g. of carbon is placed in a percolator and covered with ether, the system is flooded with carbon dioxide, and the carbon is washed with ether containing a small amount of hydroquinone. To a 300 cc. ether solution of the unsaponifiable matter of 4000 g. of cod-liver oil, 5 g. of hydroquinone is added; and the solution is then drawn, by means of a low vacuum, through the bed of carbon. The carbon is washed with four 100 cc. portions of ether, and the washings are added to the main solution of the unsaponifiable matter; and the solution is washed with dilute aqueous sodium hydroxide solution to remove the hydroquinone, and is concentrated in vacuo. The residue weighs only 85 percent as much as the crude unsaponifiable matter, is much lighter in color and has a markedly better flavor and odor, and is found by biological and color tests to contain substantially all the original vitamins A and D.

It is to be understood that the foregoing embodiment is merely illustrative and by no means limitative of the invention, which may assume various other forms—as to particular substances, proportions, and procedures—within the scope of the appended claims.

I claim:

1. The method of refining the vitamin-containing unsaponifiable matter of oils so as to recover and protect substantially the entire vitamins A and D content thereof that comprises dissolving such unsaponifiable matter in a solvent not procured from petroleum, treating the solution anaerically with an adsorbent, in the presence of an antioxidant, and discarding the adsorbent together with the impurities carried thereby.

2. The method of refining the vitamin-containing unsaponifiable matter of oils so as to recover and protect substantially the entire vitamin A and D content thereof that comprises dissolving such unsaponifiable matter in a solvent selected from the group consisting of ether, benzol, chloroform, and alcohol; treating the solution anaerically with an adsorbent selected from the group consisting of carbons of vegetable and animal origin and earths, in the presence of an antioxidant selected from the group consisting of hydroquinone and pyrogallol, and discarding the adsorbent together with the impurities carried thereby.

3. The method of refining vitamin-containing unsaponifiable matter of oils so as to recover and protect substantially the entire vitamin A and D content thereof that comprises dissolving such unsaponifiable matter in ether, treating the solution anaerically with carbon, in the presence of hydroquinone, and discarding the carbon together with the impurities carried thereby.

ARCHIE BLACK.